United States Patent [19]

Fisher et al.

[11] Patent Number: 5,231,137
[45] Date of Patent: Jul. 27, 1993

[54] ISOPROPENYL-ALPHA,ALPHA-DIMETHYLBENZYL ISOCYANATE - GRAFTED POLYMERS

[75] Inventors: Michael M. Fisher, Ridgefield; Leroy A. White, Somers; Howard R. Lucas, Danbury, all of Conn.

[73] Assignee: American Cyanamid Company, Stamford, Conn.

[21] Appl. No.: 929,745

[22] Filed: Aug. 17, 1992

Related U.S. Application Data

[62] Division of Ser. No. 571,801, Aug. 23, 1990, Pat. No. 5,164,453.

[51] Int. Cl.$^5$ .................. C08F 8/00; C08L 67/02
[52] U.S. Cl. ....................... 525/176; 525/69; 525/70; 525/177; 525/179; 525/223; 525/293; 528/75
[58] Field of Search ............ 525/69, 70, 293, 176, 525/177, 179, 223; 528/75

[56] References Cited

U.S. PATENT DOCUMENTS

| | | | |
|---|---|---|---|
| 4,579,911 | 4/1986 | D'Sidocky et al. | 525/223 |
| 4,694,057 | 9/1987 | Smith et al. | 526/310 |
| 4,766,185 | 8/1988 | Ryntz et al. | 525/479 |
| 4,839,230 | 6/1989 | Cook | 428/423.1 |
| 4,873,289 | 10/1989 | Lindner et al. | 525/293 |
| 4,983,676 | 1/1991 | Petrie et al. | 525/293 |
| 5,032,644 | 7/1991 | Biletch et al. | 525/179 |

Primary Examiner—John C. Bleutge
Assistant Examiner—Randy Gulakowski
Attorney, Agent, or Firm—Michael J. Kelly; Frank M. Van Riet; Bart E. Lerman

[57] ABSTRACT

Novel grafted polymers having backbones formed from unsaturated monomers and having pendent isocyanate containing sidechains derived from isopropenyl-alpha,alpha-dimethylbenzyl isocyanate or copolymers thereof are described.

Curable coating and molding compositions employing the novel grafted polymers of the invention in combination with isocyanate reactive materials are also described.

10 Claims, No Drawings

ISOPROPENYL-ALPHA,ALPHA-DIMETHYLBENZYL ISOCYANATE - GRAFTED POLYMERS

This is a divisional of co-pending application, Ser. No. 07/571,801, now U.S. Pat. No. 5,164,453.

FIELD OF THE INVENTION

This invention relates to the preparation of novel isocyanate-functional graft polymers. The isocyanate-functional polymers are prepared by grafting a graftable polymer with isopropenyl-alpha, alpha-dimethylbenzyl isocyanate or cografting said polymers with isopropenyl-alpha, alpha-dimethylbenzyl isocyanate in combination with a cografting comonomer.

BACKGROUND OF THE INVENTION

Isopropenyl-alpha,alpha-dimethylbenzyl isocyanate or TMI® Unsaturated Isocyanate, a product of American Cyanamid Company under the trade name TMI® (meta) Unsaturated Aliphatic Isocyanate, is a monomer which has two distinct reactive groups, a vinylic group and an isocyanate group. TMI® Unsaturated Isocyanate occurs as the meta isomer, para isomer or mixtures of meta and para isomers. The meta isomer of TMI® isocyanate is represented by the formula:

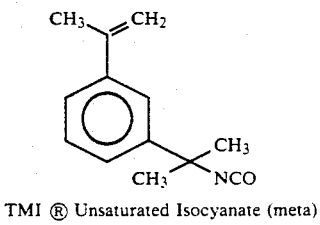

TMI ® Unsaturated Isocyanate (meta)

Grafting is an art recognized process in which a reactive material, usually a monomer or an oligomer, is attached onto a graftable material, usually a polymer having a reactive site or a functional group capable of reacting with the reactive material to be grafted. The reaction by which grafting takes place can be, without limitation, any reaction which allows two materials to combine. Most frequently, however, it is a free radical reaction.

Homografting is defined herein as a grafting process in which only a monomer of one type (viz. TMI® Unsaturated Isocyanate) is used as the reactive material, resulting in a homografted polymer having one or more groups pendently attached to the graftable polymer.

Cografting is defined herein as a grafting process in which more than one monomer is used as the reactive material resulting in a cografted polymer having groups derived from monomers as well as one or more comonomers, such as copolymeric groups pendantly attached to a graftable polymer.

Grafting of isopropenyl-alpha, alphadimethylbenzyl isocyanate onto isocyanate-reactive polymers via the isocyanate functionality has been mentioned in U.S. Pat. Nos. 4,766,185, 4,839,230, and 4,579,911 producing polymers having pendant isopropenyl groups. Furthermore, the cited patents, do not mention free radical homografting or cografting to produce polymers with pendant NCO groups.

The possibility of extrusion grafting of polyolefins with meta-isopropenyl alpha,alpha-dimethylbenzyl isocyanate via the isopropenyl group is disclosed in "Plastics Technology", Nov. 1989, p. 13. Free radical grafting of meta-isopropenyl-alpha, alpha-dimethylbenzyl isocyanate onto polyolefins, polystyrene, acrylics, and polyesters has also been disclosed in "Modern Plastics", Dec. 1989, page 16 with no mention of cografting.

European Patent Application No. 185,606, published on Jun. 25, 1986, discloses a free-radical initiated grafting of a thioester synergist adduct of meta-isopropenyl-alpha, alpha-dimethylbenzl isocyanate onto a styrene-butadiene rubber via the isopropenyl group. The grafted polymer product of the disclosure, however, is not isocyanate-functional. Furthermore, the grafting process is of low efficiency due to the poor reactivity of the isopropenyl group. Finally, the disclosure makes no reference to cografting with meta-isopropenyl-alpha, alpha-dimethylbenzyl isocyanate or adducts in combination with a cografting comonomer.

It is the object of this invention to provide isocyanate-functional polymers, a process for their preparation, crosslinkable compositions thereof, and crosslinked articles thereof, by homografting a graftable polymer with isopropenyl-alpha, alpha-dimethylbenzyl isocyanate, or cografting in combination with a congrafting comonomer.

SUMMARY OF THE INVENTION

Polymers are prepared by a novel process comprising homografting isopropenyl-alpha, alphadimethylbenzyl isocyanate, or cografting with isopropenyl-alpha,alpha-dimethylbenzyl isocyanate in combination with a cografting comonomer onto a graftable polymer such as polypropylene with the aid of a free radical initiator.

This invention is also an improved crosslinkable compositions using the novel homografted and cografted polymers of the invention.

This invention is also a crosslinked article prepared by curing the improved crosslinkable compositions containing the novel homografted or cografted polymers of the invention.

DETAILED DESCRIPTION

The novel grafted polymers of the invention are represented by the formula:

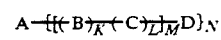

wherein

A is a graftable polymer;

B is an isocyanate—functional divalent unit derived from isopropenyl-alpha, alpha-dimethylbenzyl isocyanate;

C is a divalent unit derived from one or more unsaturated comonomer;

D is a chain terminating group;

K is the number of units of (—B—) and is an integer having a value of 1 or greater;

L is the number of units of (—C—) and is an integer having a value of zero or greater;

M is the number of repeating units of $(-B-)_K$ $(-C-)_L$ and is an integer having a value of 1 or greater;

N is an integer equal to one or greater and is the number of homografted or cografted isocyanate-functional site chains on the grafted or cografted polymer.

When L is zero, the formula above represents the homografted polymers of the invention.

When L is 1 or more, the formula above represents the cografted polymers of the invention with the understanding that the point of attachment of the cografted sidechain to the graftable polymer A is either through the unit (—B—) or (—C—).

The preferred novel isocyanate-functional grafted polymers of the invention are represented by the formula:

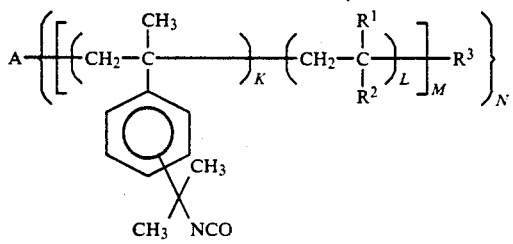

wherein:

A is a free radically graftable polymer with a saturated or unsaturated backbone such as polypropylene, polyethylene, polybutadiene, polystyrene, and the like; $R^1$ in each of the L divalent (—$CH_2CR^1R^2$—) units is the same or different and is independently selected from hydrogen or alkyl;

$R^2$ in each of the L divalent (—$CH_2CR^1R^2$—) units is the same or different and is independently selected from alkyl, aryl, aralkyl and alkaryl of 1 to 20 carbon atoms, ester of 1 to 20 carbon atoms including ester groups such as methoxycarbonyl, ethoxycarbonyl, propyoxycarbonyl, butoxycarbonyl, hexoxycarbonyl, 2-ethylhexoxycarbonyl, lauroxycarbonyl, alkoxy of 1 to 20 carbon atoms, aminocarbonyl, acetoxy, or cyano;

$R^3$ is a terminal group derived from a free radical initiator; it can also arise by disproportionation, hydrogen abstraction or chain transfer reactions taking place during the grafting process; it can be groups such as hydrogen, alkyl, alkoxy, aryl, acyloxy, or alkylthio;

K is an integer in the range of from 1 to about 25 and represents the number of repeating divalent

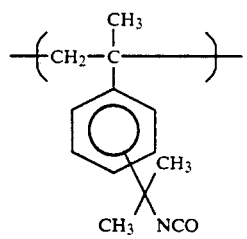

units alternating with (—$CH_2CR^1R^2$—) units; it can be the meta- or para-isomers, or mixtures thereof;

L is an integer in the range of from zero to about 100 inclusive, and represents the number of repeating divalent (—$CH_2R^1R^2$—) units;

M is an integer in the range of 1 to about 100 and represents the number of monomer-comonomer alternations when L is 1 or greater;

N is an integer equal to 1 or greater and represents the number of cografted side chains in the cografted polymers, provided that the total isocyanate group content of the cografted polymer is from about 0.01 weight percent to about 2 weight percent.

It should be recognized that the homografted and co-grafted isocyanate-functional polymers described herein arise from a statistical distribution of the various components having a distribution profile characteristic of the particular method of preparation. Thus the homografted and cografted polymers of the invention are mixtures of the various components, some having more or less TMI ® isocyanate on the selected polymer backbone with attandant differences in reactivity, molecular weight, viscosity, solubility, and etc.

The most preferred isocyanate-functional grafted polymers of the invention are represented by the formula:

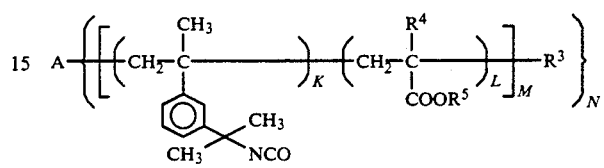

wherein $R^4$ is hydrogen or methyl group; and $R^5$ is an alkyl group or 1 to 20 carbon atoms, an aryl group, or an aralkyl group; and A, $R^3$, K, L, M, and N have the same meaning as A, $R^3$, K, L, M, and N in the above section on the preferred polymers in the section of the specifications entitled "DETAILED DESCRIPTION".

In the preferred grafted polymers of the invention, the K to L ratio is from about 1:100 to about 25:1. In the most preferred grafted polymers, to K to L ratio is from 1:1 to 1:10.

The novel grafted polymers of the invention comprise a backbone formed from one or more unsaturated monomers and have one or more pendant isocyanate containing sidechains derived from one or more monomers comprising isopropenyl-alpha, alpha-dimethylbenzyl isocyanate. The sidechain may be derived from isopropenyl-alpha,alpha-dimethylbenzyl isocyanate and one or more unsaturated comonomers. The unsaturated comonomers usable in the invention are those described in the section of the specification labelled, "COGRAFTING COMONOMER", infra.

The preferred class of usable unsaturated comonomers are acrylate esters.

PROCESS FOR PREPARING HOMOGRAFTED POLYMERS

The process for preparing an isocyanate-functional homografted polymer comprises the steps of:

(A) introducing into the reaction zone containing a graftable polymer, a homografting charge comprising:

(i) meta- or para-isopropenyl-alpha, alpha-dimethylbenzyl isocyanate represented by the formulae:

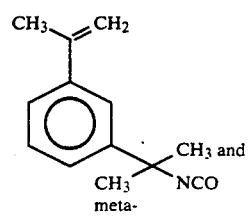

meta-

-continued

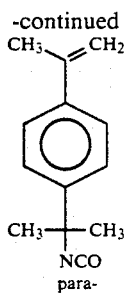
paraor a mixture thereof; and (ii) a free radical initiator;

(B) maintaining the reaction zone at a temperature and for a time sufficient to graft at least 10 percent of the isopropenyl-alpha, alpha-dimethylbenzyl isocyanate; and (C) optionally, separating the unreacted isopropenyl-alpha,alpha-dimethylbenzyl isocyanate from the homografted polymer product.

PROCESS FOR PREPARING COGRAFTED POLYMERS

The process for preparing an isocyanate-functional cografted polymer comprises the steps of:

(A) introducing into a reaction zone containing a graftable polymer, a cografting charge comprising:

(i) meta- or para-isopropenyl- alpha, alpha-dimethylbenzyl isocyanate represented by the formulae:

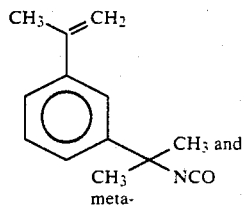
meta-

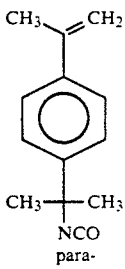
paraor a mixture thereof;

(ii) an unsaturated comonomer represented by the formula:

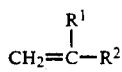

wherein $R^1$ is hydrogen or alkyl; and $R^2$ is a methoxycarbonyl, ethoxycarbonyl, propoxycarbonyl, butoxycarbonyl, hexoxycarbonyl, 2-ethylhexoxycarbonyl, lauroxycarbonyl, alkyl of 1 to 20 carbon atoms, aryl, aminocarbonyl, acetoxy, and cyano groups; and (iii) a free radical initiator;

(B) maintaining the reaction zone at a temperature and for a time sufficient to cograft at least 10 percent of the monomers; and (C) optionally, separating the unreacted monomers from the cografted polymer product.

GRAFTABLE POLYMER USED IN THE METHOD OF THE INVENTION

The graftable polymers usuable in the invention are free radically graftable polymers having saturated or unsaturated backbones such as polyolefins. They can be polyolefins such as polypropylene, polyethylene, styrenics such as polystyrene, acrylics such as polymethyl methacrylate, polybutadiene, polyester, polyvinyl chloride, polyvinyl acetate and the like The graftable polymers usable in the invention can be blends of saturated or unsaturated polymers including saturated and unsaturated elastomers. They can also be copolymers obtained by polymerizing a plurality of monomers. Examples of copolymeric graftable or cograftable polymers are those arising from the copolymerization of ethylene and propylene mixtures to produce ethylene-propylene copolymers, ethylene and vinyl acetate mixtures to produce ethylene-vinyl acetate copolymers, and other similar systems.

Particularly useful are members of the polyolefin class of polymers which includes any of the commercially produced polyolefins such as polypropylene and polyethylene, including impact improved polypropylene polymers, polypropylene blends and ethylene-containing polypropylene copolymers. They may be produced according to well-known and widely practiced methods, such as by polymerization of propylene or propylene-ethylene mixture by contacting said mixtures with Ziegler-Natta coordination catalysts, specifically those in which the transition metal is titanium.

An example of the polypropylene homopolymer usable in the invention is PRO-FAX® 6301 Plypropylene Homopolymer Resin, a product of Himont U.S.A., Inc., Wilmington, D. C. having the following porperties:

| Precent Volatiles (by volume) | Less Than 0.4 |
| --- | --- |
| Melting Point (°C.) | Greater Than 160 |
| Solubility in Water | Negligible |
| Specific Gravity | 0.88-0.92 |
| Flash Point (°C., Setchkin) | Greater Than 329 |

Another example of a polypropylene homopolymer usable in the invention is PRO-FAX® 6801 Grade Polypropylene Homopolyer Resin with properties similar to above. Other grades of polypropylene homopolymers such as PRO-FAX® 6501 Resins are also usable in this invention.

ISOPROPENYL-aloha, alpha-DIMETHYLBENZYL ISOCYANATE USEFUL IN THE METHOD OF THE INVENTION The isocyanate-functional monomers used in the invention are meta- and para-isopropenyl-alpha, alpha-dimethylbenzyl isocyanates or mixtures thereof. meta-Isopropenyl-alpha,alpha-dimethylbenzyl isocyanate, commercially available under the trade name TMI® (Meta) Unsaturated Aliphatic Isocyanate (American Cyanamid Company, Wayne, N. J. ), is the preferred isocyanate - functional monomer usable as the homografting monomer when used alone, or as the cografting monomer component when used in combination with a cografting comonomer. It is represented by the formula:

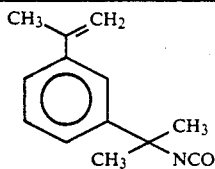

having the following properties:

| | |
|---|---|
| CAS Registry Number | 2094-99-7 |
| Appearance | Colorless Liquid |
| NCO Content (%, Theoretical) | 20.9 |
| Boiling Point (°C., 1 Atmosphere) | 270 |
| Vapor Pressure (mm Hg, 100° C.) | 2 |
| Viscosity (27° C., cp) | 3 |
| Density (g/ml) | 1.01 |

In addition to the meta- isomer above, the para-isomer of TMI, TMI ® (Para) Unsaturated Aliphatic Isocyanate, is also usable as the grafting monomer in the practice of the invention, and is represented by the formula:

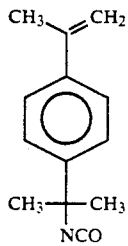

having the following properties:

| | |
|---|---|
| CAS Registry Number | 2889-58-9 |
| Appearance | Colorless liquid |
| Melting Point (°C.) | 0 |
| Vapour Pressure (25° C., mm Hg) | 0.0046 |
| Vapor Density (Air = 1) | 100.5 |

Upon grafting TMI ® Unsaturated Aliphatic Isocyanate alone or with cografting comonomer such as methyl methacrylate onto a graftable polymer such as polypropylene, an isocyanate-functional grafted polymer is produced having pendantly attached isocyanate groups capable of further reactions. A typical such reaction is crosslinking with isocyanate-reactive polyfunctional materials, particularly with moisture, amines, mercaptans and alcohols to produce polyurea and polyurethane linkages.

COGRAFTING COMONOMER USEFUL IN THE PROCESS OF THE INVENTION

Suitable congrafting comonomers are those which can copolymerize with the vinyl group of isopropenyl-alpha, alpha-dimethylbenzyl isocyanate to give copolymers which can then graft to the backbone. The comonomers are selected, without limitation, from the classes of mono-substituted and geminally disubstituted unsaturated compounds and include: alpha-olefins, vinyl carboxylates, vinyl ethers, alpha, beta-unsaturated aldehydes and ketones, styrenes, alpha-methylstyrenes, acrylic and methacrylic esters, acrylic and methacrylic amides, and acrylic and methacrylic nitriles.

The cografting comonomers usable in the invention are unsaturated comonomers represented by the formula:

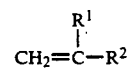

wherein $R^1$ is hydrogen or an alkyl group such as methyl, and $R^2$ is a polymerizably activating group such as methoxycarbonyl, ethoxycarbonyl, propoxycarbonyl, butoxycarbonyl, hexoxycarbonyl, 2-ethylhexoxycarbonyl, lauroxycarbonyl, alkyl of 1 to 20 carbon atoms, aryl, aminocarbonyl, alkoxy, acyloxy, cyano, and the like.

Examples of suitable cografting comonomers include the following monomers: vinyl acetate, methylene valerolactone, hexyl vinyl ether, methyl vinyl ketone, acrolein, styrene, alpha-methyl styrene, para-methyl styrene, acrylamide, methacrylamide, N,N-dimethylacrylamide, acrylonitrile, methacrylonitrile, methyl acrylate, methyl methacrylate, ethyl acrylate, ethyl methacrylate, propyl acrylate, propyl methacrylate, butyl acrylate, butyl methacrylate, hexyl acrylate, hexyl methacrylate, ethylhexyl acrylate, ethylhexyl methacrylate, lauryl acrylate, lauryl methacrylate, and the like.

The perferred class of cografting comonomers are the acrylate and methacrylate esters represented by the formula:

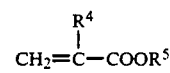

wherein $R^4$ is hydrogen or methyl and $R^5$ is an alkyl group of 1 to 20 carbon atoms, an aryl group, or an aralkyl group.

The most perferred acrylates and methacrylates are methyl methacrylate, ethyl, methacrylate, butyl acrylate, butyl methacrylate, hexyl acrylate, hexyl methacrylate, ethylhexyl acrylate, and ethylhexyl methacrylate.

FREE RADICAL INITIATORS USEFUL IN THE PROCESS OF THE INVENTION

The grafting initiators are compounds capable of generating free radicals when thermal, photochemical, actinic radiation, gramma ray, or X-ray energy is applied. Of the thermally and photochemically activated initiators, thermally generated initiators are more convenient to use and are therefore preferred over photoinitiators.

The free radical initiators usable in grafting are of the general classes of azo compounds, sulfur compounds, and peroxides. The perioxides are the preferred class of free radical initiators because of their ability to efficiently abstract a hydrogen atom from the graftable polymer thereby initiating the cografting process The peroxide initiator is selected from a group consisting of peresters, alkyl peroxides, acyl peroxides, percabonates, and hydroperoxides. The perester and alkyl peroxide initiators are the most preferred, and include initiators such as tert-butyl perbenzoate, tert-butyl peracetate, cumyl perbenzoate, tert-butyl peracetate, tert-amyl peroctoate, di-tert-butyl peroxide, di-cumyl peroxide, di-tert-amyl peroxide, 2,5-dimethyl-2,5-bis-(t-butylperoxy) hexane and 2,5-dimethyl-2,5-bis-(t-butylperoxy) hexyne-3 and 1,1-bis-(t-butylperoxy) 3,3,5-trimethylcyclohexane; and the like.

The free radical initiators can be used in combination with a chain transfer agent such as a mercaptan to limit the grafting sites and the length of the grafted side chains. Generally, however, they are not used.

RATIO AND PROPORTION OF INGREDIENTS USED IN THE HOMOGRAFTING METHOD OF THE INVENTION

The meta- or para- isopropenyl- alpha, alpha-dimethylbenzyl isocyanate concentration in the homografting charge is from about 90 weight percent to about 99.99 weight percent.

The free radical initiator concentration in the homografting charge is from about 10 weight percent to about 00.1 weight percent.

The ratio of the meta- or para-isopropenyl -alpha, alpha-dimethylbenzyl isocyanate to free radical initiator is from about 9:1 to about 9,999:1.

The ratio of the graftable polymer to the homografting charge is in the range of from about 100:1 to about 1:1, with 10:1 to 2:1 range being particularly preferred.

RATIO AND PROPORTION OF INGREDIENTS USED IN THE COGRAFTING METHOD OF THE INVENTION

The meta- or para-isopropenyl-alpha, alpha-dimethylbenzyl isocyanate concentration in the cografting charge is from about 10weight percent to about 90 weight percent, with 20 weight percent to 40 weight percent range being particularly preferred.

The unsaturated comonomer concentration in the cografting charge is from about 90 weight percent to about 10 weight percent, with 80 weight percent to 60 weight percent range being particularly preferred.

The weight percent of the free radical initiator in the cografting charge is from about 0.01 weight percent to about 10 weight percent, with 2 weight percent to 4 weight percent range being particularly preferred.

The ratio of the meta- or para-isoprop-enyl-alpha, alpha-dimethylbenzyl isocyanate to the unsaturated comonomer is from about 9:1 to about 1:9.

The ratio of the total monomers (viz. metaor para-isoprenyl-alpha, alpha-dimethylbenzyl isocyanate and the unsaturated comonomer) to the free radical initiator is from about 9 : 1 to about 9,000:1.

The ratio of the graftable polymer to congrafting charge is in the range of from about 100:1 to about 1:1, with 10:1 to 2:1 range being particularly preferred.

REACTION CONDITIONS FOR HOMOGRAFTING OR COGRAFTING USED IN THE METHOD OF THE INVENTION

The reaction zone in the process of the invention is a reactor suitable for the purpose of carrying out either batch or continuous reactions. The high shear mixer or extrusion chamber of a hot melt extruder are suitable reaction zones.

In both homografting an cografting processes, the temperature of the reaction zone in the process of the invention is maintained within the range of from about 80° C. to about 280° C., with 130° C. to 220° C. range being preferred, and 150° C. to 180° C. range being particularly preferred.

The introduction time of the homografting or cografting charge in the process of the invention is in the range of about 5 seconds to about 5 hours, with 1 to 3 hour range being particularly preferred for the high shear mixer reaction zone and 5 seconds to 30 minutes range for the extrusion chamber.

The homografting or cografting times after the addition of the homografting or cografting charge is in the range of about 5 minutes to about 5 hours, with 1 to 3 hours range being particularly preferred, so that at least 10 weight percent of the monomers in the homografting or cografting charge are allowed to react.

After homografting or cografting, the unreacted monomers can be separated from the homografted or cografted polymers by extraction with a monomer dissolving solvent or by vacuum distillation.

CROSSLINKABLE COMPOSITIONS

The crosslinkable compositions of the invention comprise:
(a) an isocyanate-reactive material; and
(b) an isocyanate-functional polymer;
wherein the improvement comprises:
using as the isocyanate-functional polymer (b) an isocyanate-functional grafted polymer represented by the formula:

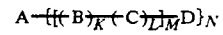

wherein
A is a graftable polymer,
B is an isocyanate-functional divalent unit derived from isopropenyl-alpha, alpha-dimethylbenzyl isocyanate;
C is a divalent unit derived from one or more unsaturated comonomers;
D is a chain term terminating group;
K is the number of units of (—B—) and is an integer having a value of 1 or greater;
L is the number of units of (—C—) and is an integer having a value of 0 or greater;
M is the number of repeating units of $(-B-)_K$ $(-C-)_L$ units and is an integer having a value of 1 or greater; and
N is an integer equal to one or greater and is the number of grafted side chains on the grafted polymer.

The preferred isocyanate-functional polymers (b) are the grafted polymers of the invention depicted above wherein:
K is an integer in the range of from 1 to about 25; and
L is an integer in the range of from 0 to about 100; and
M is an integer in the range of from 1 to about 100; and
N is an integer equal to 1 or greater, with the proviso that the total isocyanate group content of the grafted polymer is from about 0.01 to about 2 weight percent.

The graftable polymers are those described previously and include saturated and unsaturated polymers. Typical graftable polymers usable in the improved crosslinkable compositions are polypropylene, polyethylene, polystyrene, polymethyl methacrylate, polyester, polyvinyl acetate, ethylene-propylene copolymers, ethylene-vinyl acetate copolymers, and mixtures thereof.

The isocyanate functional divalent unit B is derived from isopropenyl-alpha, alpaha-dimethylbenzyl isocyanate isomers or mixtures thereof, and particularly, B is derived from meta-isocpropenyl-alpha, alpha-dimethylbenzyl isocyanate.

The divalent group C is derived from one or more unsaturated monomers and is represented by the formula:

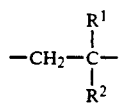

wherein:

$R^1$ in each of the L divalent ($-CH_2CR^1R^2-$) units is the same or different and is selected from the group consisting of hydrogen and alkyl of 1 to 20 carbon atoms; and $R^2$ in each of the L divalent ($-CH_2CR^1R^2-$) units is the same or different and is selected from the group consisting of alkyl of 1 to 20 carbon atoms, alkoxy of 1 to 20 carbon atoms, aryl, aralkyl, alkaryl, aminocarbonyl, alkoxycarbonyl wherein the alkoxy group is of 1 to 20 carbon atoms.

The isocyanate-reactive material (a) in the improved composition can be polyfunctional material such as hydroxyfunctional polymer, aminofunctional polymer, mercapto-functional polymer, or mixtures thereof. It can also be a polyfunctional monomeric material such as diols, triols, diamines, triamines, and higher polyfunctional polyols, polyamines, and polymercaptans. Hydroxy-functional acrylic acrylic and polyesters may also be used in tho compositions of the invention provided that they are of sufficiently low molecular weight to have satisfactory cure rates. Solid particles containing isocyanate-reactive functional groups on their surface such as those having sorbed hydroxy, amine, or mercapto groups are also usable as the isocyanate-reactive materials of the invention. Materials such as starch, cellulose, clay, and mica may also be used as isocyanate-reactive materials.

An improved method of crosslinking is practiced by heating a mixture of an isocyanate-reactive material and an isocyanate-functional polymers wherein the improvement comprises: heating as the mixture of isocyanate-reactive material and isocyanate-functional polymers, the crosslinkable compositions described in this section.

EXAMPLE 1

COGRAFTING meta-ISOPROPENYL-alpha, alpha-DIMETHYLBENZYL ISOCYANATE ON POLYPROPYLENE AT 146° C.

A solution of methyl methacrylate (70.0g, 0.70 mole), meta-isopropenyl-alpha, alpha-dimethyl-benzyl isocyanate, a product of American Cyanamid Company, Wayne, N. J., under the trade name TMI ® (Meta) Unsaturated Aliphatic Isocyanate (30g, 0.15 mole), and tertiary-butyl perbenzoate, a product of Lucidol Division of Pennwalt Corporation, Buffalo, N. Y. (3.0g, 0.015 moles) was added dropwise, over a period of two hours, to a purged ($N_2$) and heated (135° C.) Sigma Mixer flask containing PRO-FAX ® 6301 Polypropylene Homopolymer Resins, a product of Himont U.S.A., Inc., Wilmington, DE (300g). During the course of the addition, the temperature of the mixture rose to 146° C. keeping the mixture under gentle reflux in the first half of the addition. The reaction temperature was kept at 146° C. for an additional two hours and then allowed to cool to room temperature to give, after removal of unreacted monomers by vacuum distillation, a co-grafted polypropylene product. Before vacuum distillation, the product had the following characteristics:

(1) When the reaction product was stirred in acetone at room temperature for 24 hours, the acetone soluble components were extracted and the extract contained, in addition to acetone, the following:

(a) meta-isopropenyl-alpha, alpha-dimethyl-benzyl isocyanat (0.21g, corresponding to 0.7g of the original charge, as determined by quantitative gas chromatography).

(b) methyl methacrylate (0.07g, corresponding to 0.1% of the original charge, as determined by quantitative gas chromotography).

(c) no ungrafted copolymer was present as determined by attempted precipitation with large amounts of hexane.

(2) The grafted reaction product contained areas of infusible particles.

(3) The grafted product was suitable for the preparation of compression molded parts.

(4) The grafted product had a melt index of 21.2.

Example illustrates the preparation and properties of an isocyanate-functional cografted polypropylene polymer of the invention.

EXAMPLE 2

COGRAFTING meta-ISOPROPENYL-alpha, alpha-DIMETHYLBENZYL ISOCYANATE AND METHYL METHACRYLATE ON POLYPROPYLENE AT 165° C.

The procedure of Example 1 was followed except grafting was carried out at 165° C. The infrared spectrum of the cografted polypropylene showed the presence of isocyanate groups in the cografted product.

Acetone extraction and gas chromatographic analysis indicated that 17.2% of the original charge of the meta-isopropenyl-alpha, alpha-dimethylbenzyl isocyanate was unreacted and 3.7% of the original charge of the methyl methacrylate was unreacted.

No ungrafted copolymer or infusible particles were detected.

This Example also illustrates the preparation of an isocyanate-functional cografted polypropylene polymer of the invention.

EXAMPLE 3

HOMOGRAFTING meta-ISOPROPENYL-alpha, alpha-DIMETHYLBENZYL ISOCYANATE ON POLYPROPYLENE The procedure of Example 2 was followed except no methyl methyacrylate was used and 30 grams of TMI ® (meta) Unsaturated Aliphatic Isocyanate was added. At the end of the grafting process, 64% of the original charge of the meta-isopropenyl-alpha, alpha-dimethylbenzyl isocyanate was still unreacted.

This Example, in combination with Example 1 and 2, illustrates that:

(a) homografting meta-isopropenyl-alpha, alpha-dimethylbenzyl isocyanate by itself is a lower efficiency process than cografting; and (b) cografting meta-isopropenyl-alpha, alpha-dimethylbenzyl isocyanate in combination with a cografting comonomer such as methyl methacrylate is a high efficiency method of introducing an isocyanate functionality into a graftable polymer such as polypropylene.

EXAMPLE 4

PREPARATION OF COGRAFTED POLYPROPYLENE MOLDINGS FROM ISOCYANATE-FUNCTIONAL COGRAFTED POLYPROPYLENE

MOLDING A

PRO-FAX® 6301 polypropylene Homopolymer Resin (15g) was placed in a 6.35 cm X 6.35cm mold at 175° C. under a slight pressure for 2 minutes. Thereafter, the pressure was raised to about 35,000 KPa. The mold was cooled to 25° C. The cooling time was five minutes. From the molding sample microtensiles were cut for testing.

MOLDING B

The procedure of Molding A was followed with the exception that the polypropylene and tertiarybutyl perbenzoate were subjected to the reaction conditions of the Example 2, in the absence of monomer or comonomer.

MOLDING C

The procedure of Molding A was followed with the exception that the product of Example 1 was used instead of the PRO-FAX® 6301 Polypropylene Resin.

MOLDING D

The procedure of Molding A was followed with the exception that the product of Example 2 was used instead of the PRO-FAX® 6301 Polypropylene Homopolymer Resin.

MOLDING E

The procedure of Molding A was followed with the exception that the product of Example 3 was used instead of the PRO-FAX® 6301 Polypropylene Homopolymer Resin.

The physical properties of the molding are summarized in TABLE 1.

It is concluded from the results in Table 1 that there is little or no loss of the physical properties of the polypropylene as a result of grafting with isopropenyl-alpha, alpha-dimethylbenzyl isocyanate.

PART 1

EXTRUSION HOMOGRAFT A

A mixture of NORCHEM® 831 Low Density poly-Ethylene (LDPE) having a melt index of 9 (100g), TMI® (meta) Unsaturated Isocyanate (2.0g), and 2, 5-dimethyl-2, 5-di(tert-butylperoxy) hexane under the trade name LUPERSOL® 101 Initiator, a product of Pennwalt Corporation, Philadelphia, PA, (0.2g), was fed into a Twin Screw Bradender Extruder (3.5 amp, 24 RPM) in a single pass. The temperature of zones 1, 2, 3 and 4 (Die) were 174, 200, 200, and 182° C., respectively.

PART 2

EXTRUSION COGRAFT A

The procedure of Example 5, PART 1 was followed with the exception that the TMI® was replaced with a mixture of TMI® and Styrene (2.0g) consisting of TMI® (1.32g) and styrene (0.68g) and having a TMI®: Styrene mole ratio of 1:1.

PART 3

EXTRUSION HOMOGRAFT B

The procedure of EXAMPLE 5, PART 1 was repeated with the exception that the NORCHEM® 831 LDPE graftable polymer was replaced by ELVAX® 350 Ethylene Vinyl Acetate (EVA) 75/25 Copolymer, a product of I.E. DuPont de Nemours Corporation, Wilmington, DE, having a melt index of 19. The extrusion temperature of zone 1 and Zone 4 (Die) were both 150° C., slightly lower than in PART 1.

PART 1

EXTRUSION HOMOGRAFT C

The procedure of EXAMPLE 5, PART 1 was followed with the exception that the NORCHEM° 831 LDPE graftable polymer was replaced by DOW® 4012 Linear Low Density Poly-Ethylene (LLDPE) a product of Dow Chemical, Mildland, MI, and the amount of LUPERSOL® 101 was doubled to 0.4 grams.

The amount of TMI® (meta) Unsaturated Isocya-

TABLE 1 meta-ISOPROPENYL-alpha, alpha-DIMETHYLBENZYL ISOCYANATE/ METHYL METHACRYLATE COGRAFTED MOLDINGS

| Physical Properties of the Moldings | A Control (Polypropylene) | B Control (Polypropylene) and Peroxide | C Cografted (Polypropylene) (146° C.) | D Cografted (Polypropylene) (165° C.) | E Homografted (Polypropylene) (165° C.) |
|---|---|---|---|---|---|
| Tensile Strength (ASTM D638) | 3,700 | 1,200 | 1,500 | 2,840 | 1,600 |
| Tensile Modulus (ASTM D638) | 236,000 | 170,000 | 116,000 | 170,000 | 220,000 |
| Elongation (%) (ASTM D638) | 3.4 | 0.90 | 2.0 | 3.5 | 1.0 |
| Melt Index (ASTM D1238L) | 14.6 | 1394 | 21.2 | 100.2 | 631 |
| Tg (°C.) (Glass Transition) | 53 | −12, +36 | | −15, +38 | −10, +41 |
| Melting Point (°C.) | 170 | 164 | | 160 | 170 |

EXAMPLE 5

This Example illustrates extrusion homografting and extrusion cografting of polymers with TMI® (meta) Unsaturated Isocyanate Monomer.

nate grafted or cografted expressed as percent of the original charge for extrusion cograft A and extrusion homografts A, B, and C are listed in TABLE 2.

It is concluded from the results in TABLE 2 that the efficiency of grafting is higher at lower monomer/free radical mole ratios, and cografting is more efficient than sample homografting, other factors being equal.

EXAMPLE 6

The procedure of EXAMPLE 5, PART C was followed with the exception that only half the amount of LUPERSOL ® 101 Free Radical Initiator was used (0.2 grams instead of 0.4g). The TMI ®/Free Radical mole ratio was 8. After drying for 6 hours at 138° C., 18% of the TMI ® monomer was grafted (as determined by infrared spectroscopy).

The TMl ® grafted DOW ® 4012 LLDPE polymer containing 0.36% grafted TMI ® was press - molded into three thin films of 0.20 mm thickness.

The first film was heated in water at 60° C. for 20 hours, and then heated at 105° C. for 20 hours to dry and to cure. The product obtained was a film. The film was then treated with hot xylene and thereafter it weakened and disintegrated to a gel.

The second film was heated in a mixture of equal parts of water and concentrated ammonia at 60° C. for 20 hours and then heated at 105° C. to dry and to cure. The product obtained was a weak film, insoluble in hot xylene, but showed some disintegration.

The third film was heated in toluene containing 10% by weight diethlene triamine at 60° C. for only four hours. The product was heated at 105° C. for 20 hours to dry and to cure. The product obtained was a film having considerable strength, insoluble in hot xylene, and did not disintegrate but retained its shape.

It is concluded from the experiments in this Example that the m-TMI-grafted DOW ® 4012 LLDPE polymer is capable of crosslinking with a polyfunctional crosslinking agent such as diethylene triamine to produce insoluble cured or crosslinked films which do not disintegrate in hot xylene.

TABLE 2

| TMI ®/LUPERSOL ® 101 HOMOGRAFTING AND COGRAFTING EFFICIENCY | | | | |
|---|---|---|---|---|
| | EXTRUSION HOMOGRAFT A (TMI ®) | EXTRUSION[1] COGRAFT A (TMI ®/Styrene) | EXTRUSION HOMOGRAFT B (TMI ®) | EXTRUSION HOMOGRAFT C (TMI ®) |
| GRAFTABLE POLYMER | NORCHEM ® 831 (LDPE)[2] | NORCHEM ® 831 (LDPE)[2] | ELVAX ® 350 (EVA)[3] | DOW ® 4012 (LLDPE)[4] |
| Monomers/Free Radials (Mole Ratio) | 8 | 8 | 8 | 4 |
| Monomers/Graftable Polymer | 0.02 | 0.02 | 0.02 | 0.02 |
| Amount of TMI ® Grafted[5] (Percent) | 14 | 17 | 23 | 28 |

[1]Cografting with 1:1 molar ratio mixture of TMI ® (meta) Unsaturated Isocyanate and Styrene.
[2]LDPE: Low Density Polyethylene.
[3]EVA: Ethylene/Vinyl Acetate Copolymer.
[4]LLDPE: Linear Low Density Polyethylene.
[5]Homografted or cografted.

Although the present invention has been described with reference to certain preferred embodiments, it is apparent that modifications and variations thereof may be made by those skilled in the art without departing from the scope of this invention as defined by the appended claims.

We claim:

1. An improved crosslinkable composition comprising a mixture of:
   a) an isocyanate-reactive material, and
   b) an isocyanate-functional polymer;
   wherein the improvement comprises:
   using as the isocyanate-functional polymer (b) an isocyanate-functional grafted polymer represented by the formula:

$$A\text{---}\{(\text{---}B\text{---})_K(\text{---}C\text{---})_L\}_M D\}_N$$

wherein
A is a graftable polymer;
B is a isocyanate-functional divalent unit derived from isopropenyl-alpha, alpha-dimethylbenzyl isocyanate;
C is a divalent units derived from one or more unsaturated comonomers;
D is a chain terminating group;
K is the number of units of (—B—) and is an integer having a value of 1 or greater;
L is the number of units of (—C—) and is an integer having a value of 0 or greater;
M is the number of repeating units of $(\text{---}B\text{---})_K (\text{---}C\text{---})_L$ units and is an integer having a value of 1 or greater; and
N is an integer equal to one or greater and is the number of grafted side chains on the grafted polymer.

2. The composition of claim 1 wherein the isocyanate-reactive material (a) is selected from the group consisting of hydroxy functional polymers, amino functional polymers, mercapto functional polymers, and mixtures thereof.

3. The composition of claim 2 wherein the isocyanate reactive material (a) is a hydroxy functional acrylic resin.

4. The composition of claim 2 wherein the isocyanate reactive material (a) is a hydroxy functional polyester resin.

5. The composition of claim 2 wherein the isocyanate functional polymer is a grafted polymer wherein:
K is an integer in the range of from 1 to about 25; and
L is an integer in the range of from 0 to about 100; and
M is an integer in the range of from 1 to about 100; and
N is an integer equal to 1 or greater, with the proviso that the total isocyanate group content of the grafted polymer is from about 0.01 to about 2 weight percent.

6. The composition of claim 1 wherein A is a graftable polymer selected from the group consisting of polyproplyene, polyethylene, polystyrene, polymethyl methacrylate, polyester, polyvinyl acetate, ethylene-propylene copolymer, ethylene-vinylacetate copolymer, and mixtures thereof.

7. The composition of claim 1 wherein B is an isocyanate-functional divalent group derived from meta-isopropenyl-alpha,alpha-dimethylbenzyl isocyanate.

8. The composition of claim 1 wherein C is a divalent group represented by the formula:

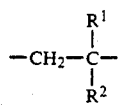

wherein:
R$^1$ in each of the L divalent (—CH$_2$CR$^1$R$^2$—) units is the same or different and is selected from the group consisting of hydrogen and alkyl of 1 to 20 carbon atoms; and
R$^2$ in each of the L divalent (—CH$_2$CR$^1$R$^2$—) units is the same or different and is selected from the group consisting of alkyl of 1 to 20 carbon atoms, aryl, aralkyl, alkaryl, aminocarbonyl, alkoxycarbonyl wherein the alkoxy group is of 1 to 20 carbon atoms, aryloxycarbonyl, acyloxy of 1 to 20 carbon atoms, cyano, and mixtures thereof.

9. A crosslinked article prepared by heating the composition of claim 1.

10. An improved method of crosslinking by heating a mixture of an isocyanate-reactive material and an isocyanate-functional polymer;
wherein the improvement comprises:
heating as the mixture of material and polymer the crosslinkable composition of claim 1.

* * * * *